United States Patent [19]

Legris

[11] 4,431,216
[45] Feb. 14, 1984

[54] INSTANT FITTINGS FOR PIPES AND TUBES

[75] Inventor: Andre Legris, Saint Maur, France

[73] Assignee: Legris, France

[21] Appl. No.: 244,719

[22] Filed: Mar. 17, 1981

[30] Foreign Application Priority Data

Mar. 28, 1980 [FR] France ................ 80 07092

[51] Int. Cl.³ .......................................... F16L 21/08
[52] U.S. Cl. .................................. 285/104; 285/169; 285/249; 285/323
[58] Field of Search .............. 285/322, 323, 104, 105, 285/113, 249, 169

[56] References Cited

U.S. PATENT DOCUMENTS

| | | | |
|---|---|---|---|
| 1,394,071 | 10/1921 | Driscoll | 285/323 X |
| 2,047,569 | 7/1936 | Loomis | 285/105 |
| 2,702,202 | 2/1955 | Kaiser . | |

FOREIGN PATENT DOCUMENTS 2319833  2/1977  France .

*Primary Examiner*—Thomas F. Callaghan
*Attorney, Agent, or Firm*—Bacon & Thomas

[57] ABSTRACT

The present invention relates to instant fittings for smooth, bare tubes, comprising a hollow body having a bore corresponding to the section of passage of the fluid and an inner housing in which is disposed the tube retaining means, said tube being held by an obturation and abutment means, mounted on the body at one of the ends of the housing on the side of the entry of the tube in the fitting. The housing which presents at least two successive bores encloses a locking element and a tube retaining member generally tubular in form, which are mounted to slide axially in said housing, said retaining member and said locking element comprising click means ensuring a tightening stress of the retaining member on the tube. The invention is used for the connection of tubes.

17 Claims, 33 Drawing Figures

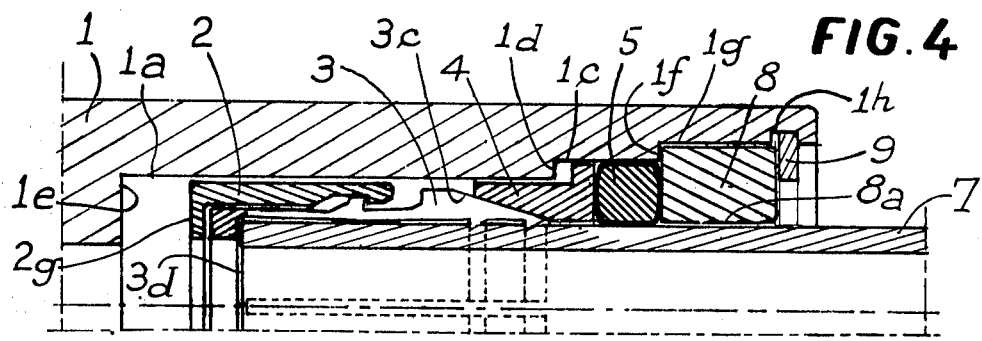
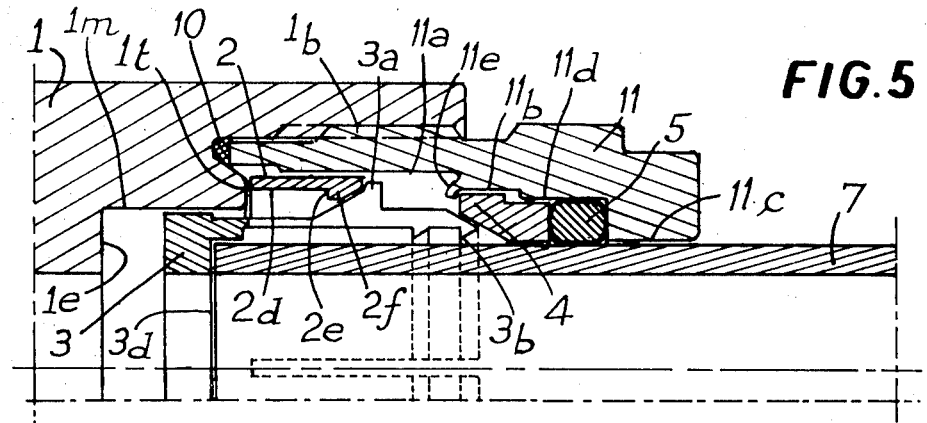
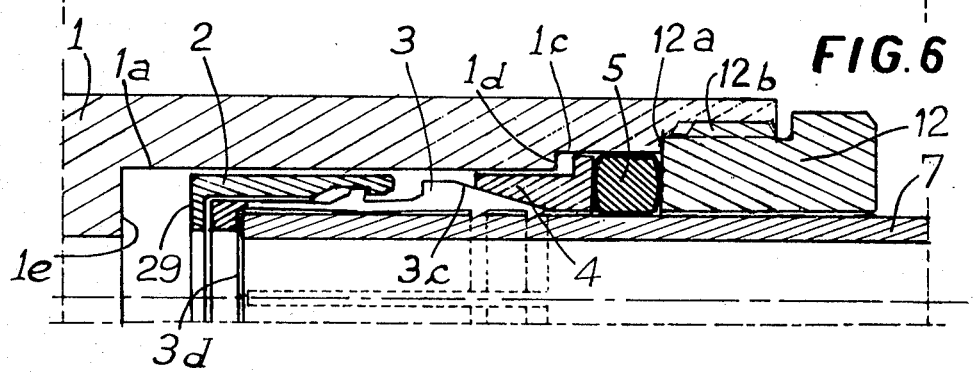
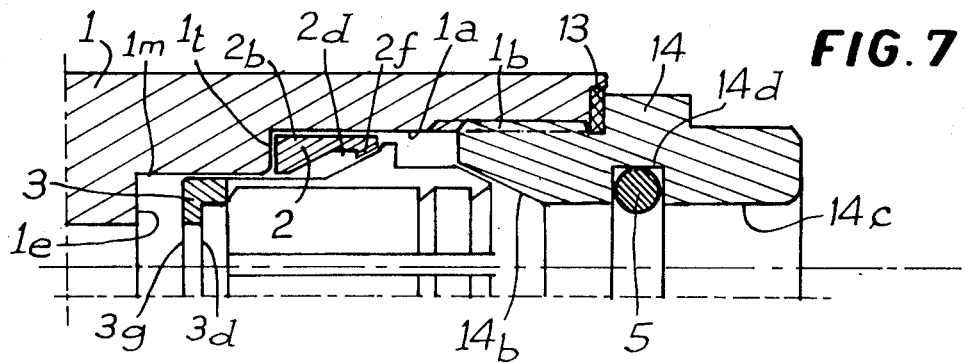

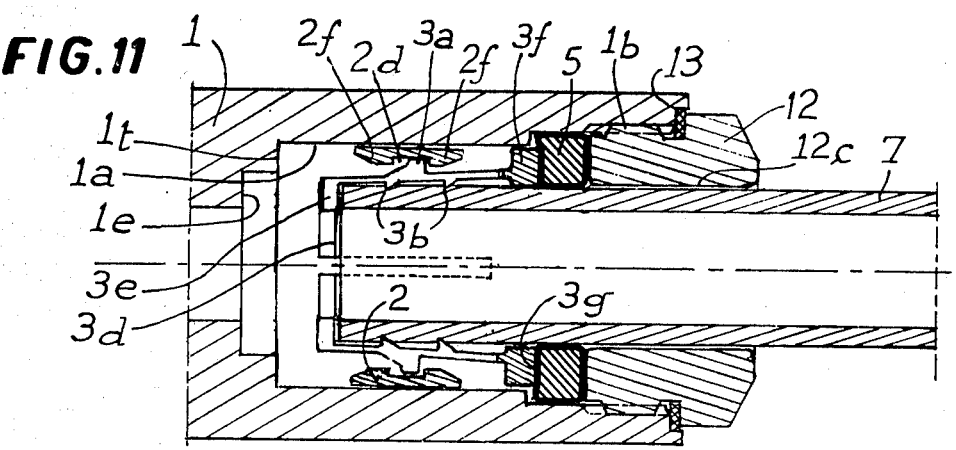
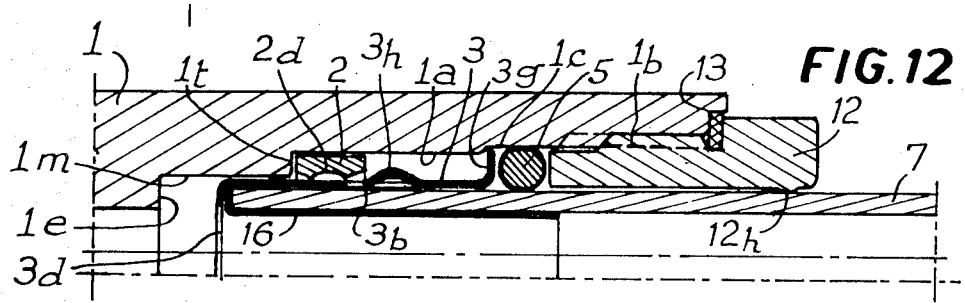
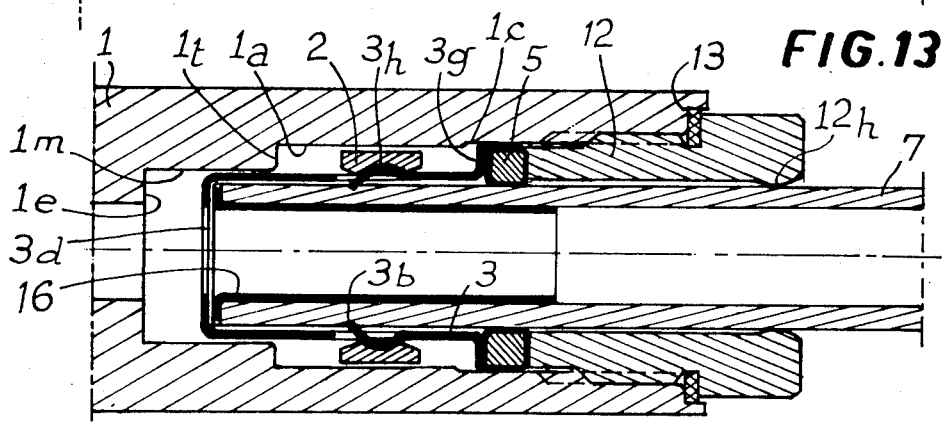
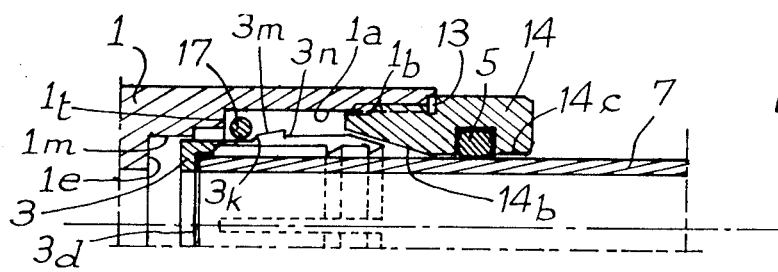

INSTANT FITTINGS FOR PIPES AND TUBES

The present invention relates to an improvement in instant fittings or unions for plastic or metal pipes or tubes, in which the tubes are not subjected to any preparation and are simply fitted in the union. The holding of the tube and tightness are effected automatically without the user having to make adjustments to the fitting. These fittings are called instant fittings since they require no assembly time and necessitate only that the tube be passed up to the end of the fitting.

Numerous types of instant fittings are known which presently embody the most recent connecting technique. This technique is in particular intensively used on compressed air connections with plastics tubes.

The only drawback of such fittings resides in that the tube must absolutely be completely mounted at the end of the fitting. This is not always the case, as the users do not always push the tube in completely and, in this case, there may be tubes which leak or which do not hold. This is not too inconvenient in most cases, but, in a certain number of uses of such fittings, it is indispensable that the connection be completely safe as, in such uses, human life is sometimes at stake. This is the case of compressed air braking used in lorries, as well as of supplies of combustible gases for industries and households. In the chemical industry, the connection of the tubes is also vital as dangerous products may spread if the connections are not sure. In other cases, such as central heating or hot water connections for domestic and industrial sanitary equipment, there must never be any leak and therefore it is indispensable that the tightness and holding of the tube be sure. In fact, a water leakage in an appartment or in industrial premises is disastrous.

It is an object of the invention to overcome the shortcomings of the instant fittings for tubes and pipes and to avoid poor assembly by the personnel passing the tube in the fitting.

The assembly of a tube in an instant fitting consists in threading this tube through a certain number of obstacles which are the sealing elements and tube retaining pieces. Each time one of these elements is passed, a resistance is generally encountered which opposes the movement of assembly. As the device comprises at least two elements, the sealing element and the tube retaining system, the user might stop the movement of the tube as soon as he encounters the first resistance and might think that he has completely assembled the tube. This results in that the tube, depending on the position of the retaining means and the sealing means, presents the following defects: either the tube does not hold, or the tube leaks.

The invention remedies these drawbacks: it provides the user effecting assembly with automatic checking during assembly without his having to think. The process consists in eliminating any tightening of the tube retaining portion. Therefore, there remains only the friction of the sealing means to be overcome. When the tube, which arrives virtually freely in the fitting, abuts inside the tube retaining means, the latter then takes said means towards the end of the fitting. A calibrated point of resistance has then been established which is embodied as a sharp click, which is released by a normal force for the user who is effecting assembly. When the click has been felt by the user, the tube advances rapidly and abuts at the end of the fitting.

When the position corresponding to the click has been passed, an efficient tensioning and locking of the retaining member is produced on the tube, inside the fitting. If the click which is normally felt by the user does not take place, the retaining member is not tensioned on the tube and the tube is not held in the fitting. This immediately reveals poor assembly from the beginning, during the checking operations. Example: for the braking of lorries, the tube is ejected automatically upon pressurisation during assembly checks at the factory. Example: upon circulation of water for checking the circuit of the sanitary equipment, when the latter is entirely connected, the leaking fittings are immediately visible.

A simple check upon assembly consists in pulling on the tube after having fitted it. If the tube is well mounted, it holds and, if the tube has not been completely locked, it comes out easily when pulled by hand.

The position of the tube is therefore very important and particularly the fact that, during its displacement, it tensions the retaining member itself when it arrives almost at the end of the fitting, along a predetermined, fairly short stroke. It is therefore indispensable that the tube reaches the end of the fitting completely, which is the purpose aimed at, for the locking of the tube to be effected.

The device therefore comprises a member on which the tube abuts and which is taken along thereby, so that, in its movement, it opposes a resistance which suddenly yields for a determined force and which, upon this force, effects locking of the tube retaining member or which releases the tube retaining member which is under stress.

The device according to the invention causes as great a click of the members as possible, followed by a sudden stop causing shocks between the members, in order to produce a sound and, in any case, a shock which notifies the user during assembly.

Different types of instant fittings are known, and in particular, those filled by the Applicant under French Pat. Nos. 2 012 796, 73 14829, 73 14830, 74 02124, 73 20453, 74 01617, 74 10580, 74 25105, 75 23879.

However, the improved fitting according to the invention presents a considerable improvement in safety with respect to these known instant fittings.

The functions of holding and tightness are much more important in the fitting according to the invention than the function of dismantling which is not instantaneous in this fitting. Dismantling takes place by removing a clip or by unscrewing a nut, which gives access to the interior system of the fitting, particularly to change a sealing element or dismantle a tube, after having unlocked the safety locking means.

The device according to the invention is incorporated in fittings of conventional outer appearance, tee, elbow, straight or double union, banjo fittings, etc. . . . , the device being substituted for the conventional connection means. However, the device is also incorporated in elements constituting a cartridge and which are directly mounted on the apparatus, so that by interior of the cartridge is accessible either by one end of cartridge by dismantling a clip or a screw, or by the other end of the cartridge, after having disconnected the latter from the apparatus on which it was mounted.

According to the present invention, an improvement in instant fittings for smooth, bare tubes is provided, said fittings comprising a hollow body having a bore corresponding to the section of passage of the fluid and an inner housing in which is disposed the tube retaining means, said tube being held by an obturation and abutment means, mounted on the body at one of the ends of the housing on the side of the entry of the tube in the fitting, said obturation means comprising an annular O-ring for the tube, wherein the housing which presents at least two successive bores encloses a locking element and a tube retaining member generally tubular in shape, which are mounted to slide axially in said housing, said retaining member and said locking element comprising click means ensuring a tightening stress of the retaining member on the tube, said click means being actuated when the tube slides in the fitting, said tube taking along the locking element and the retaining member.

The invention will be more readily understood on reading the following description with reference to the accompanying drawings, in which:

FIG. 4 is a half-view in axial section of another embodiment of the fitting of which the obturation is effected by a locked ring.

FIG. 5 is a half-view in axial section of a fitting comprising a screwed envelope.

FIG. 6 is a half-view in axial section of a fitting of which the obturation is effected by an internally screwed ring.

FIG. 7 is a half-view in axial section of a fitting of which the obturation is effected by a screwed stopper bearing an O-ring and a female tightening cone.

FIG. 11 is a view in axial section of the same fitting as in FIG. 10 in position of use.

FIG. 12 is a half-view in section of a fitting in which the retaining member is made of thin metal.

FIG. 13 is a view in axial section of the same fitting as in FIG. 12 in locked position.

FIG. 14 is a half-view in section of a fitting in which the locking element is constituted by an elastic ring.

Figure 1:
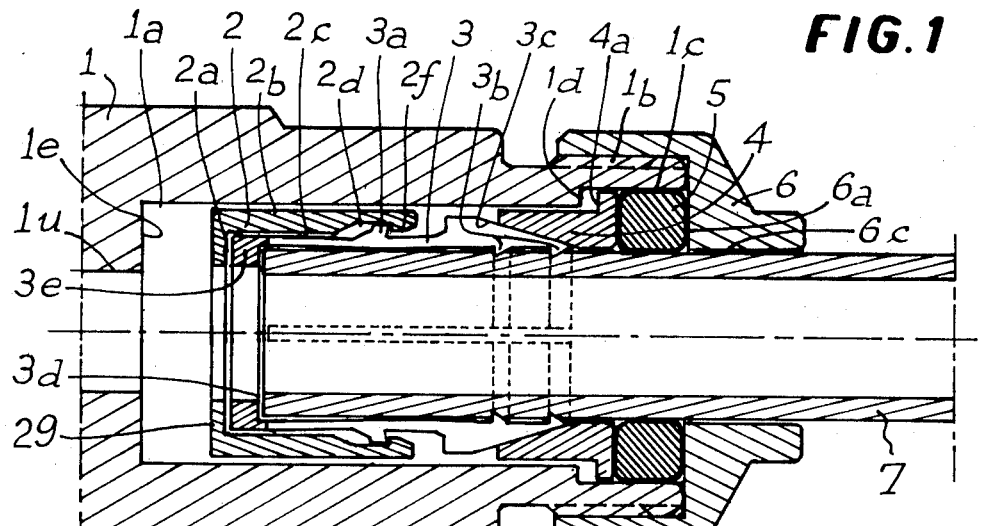
FIG. 1 is a view in axial section of an embodiment of an improved instant fitting according to the invention in position of use.
Figure 2:
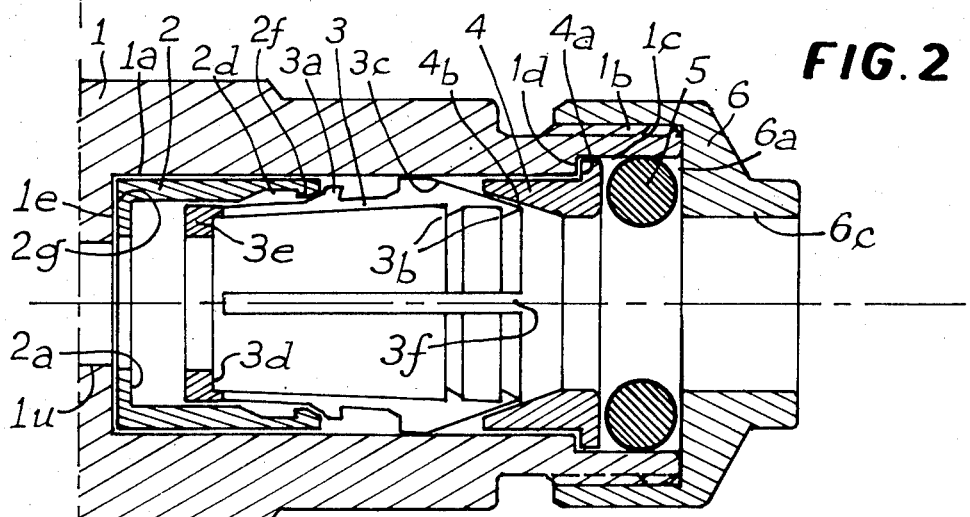
FIG. 2 is a view of the same fitting as in FIG. 1, before the tube is introduced.
Figure 3:
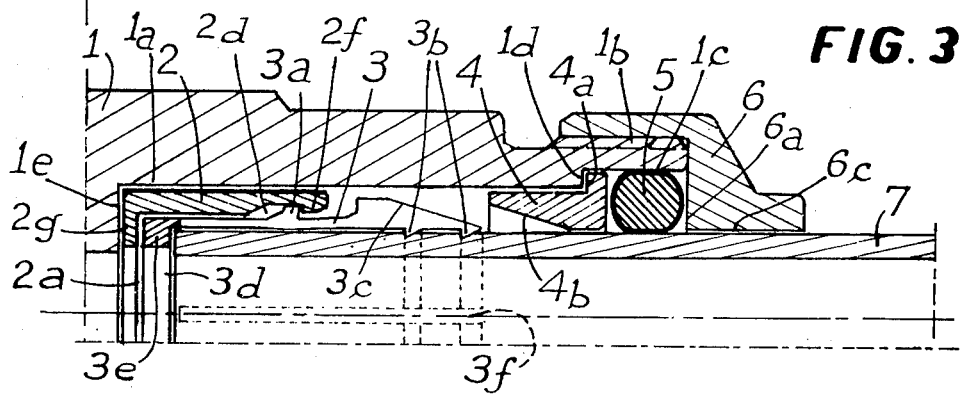
FIG. 3 is a half-view of the same fitting after the tube has been engaged and the interior pieces locked.

Referring now to the drawings, FIGS. 1, 2 and 3 show an embodiment of a fitting according to the invention which comprises a hollow body 1 presenting two bores 1a and 1c, of which one, 1a, is extended by a bore 1u corresponding to the orifice of passage of the fluid. At one of its ends, the body 1 presents a threaded portion 1b on which is screwed a nut 6 presenting a bore 6c for the passage and guiding of a tube 7 at the entry of the fitting. An annular O-ring 5 of toric form (in particular lipped, etc..) is disposed in the bore 1c, which seal is in abutment, on one side, against a face 6a of the nut 6 and, on the other side, against a face of an intermediate member 4, itself in abutment via a flange 4a against a shoulder 1d of the body. The intermediate member 4, which separates the seal 5 from the tube retaining members which will be described hereinafter, presents a bore for guiding the tube, followed by a female conical portion 4b adapted to cooperate with a corresponding conical portion 3c of a retaining member 3.

This retaining member 3 which is disposed in the bore 1a of the body following the intermediate member 4 is constituted by a tubular portion presenting a plurality of slots 3f, in order to divide said tubular portion into a plurality of sectors adapted to move radially to obtain a tightening on the tube 7. Said member internally comprises on its deformable portion teeth 3b adapted to be engaged in the wall of the tube 7 and, externally, a circular rib 3a for clicking. At its end directed towards the end 1e of the bore 1a, the retaining member 3 comprises a non-split annular portion 3e which ensures connection between the sectors of the deformable portion, said annular portion 3e presenting a radial flange 3d against which the end of the tube 7 is in abutment.

A locking element 2 is also disposed in the bore 1a of the body around the retaining member 3, said locking element being constituted by a rigid ring having a circular rib 2f at one of its ends and followed by a groove 2d whose inner diameter is smaller than that of the rib 3a of the retaining member in the free state.

On the side opposite the rib 2f, the locking element presents a radial flange 2g against which the annular portion 3e of the retaining member may abut. The radial flange 2g of the locking element has three precise functions:

(1) the role of stop at the end of the body, (2) the role of stop against the retaining member at 2a, (3) this radial flange renders it impossible to assemble the locking element 2 back to front inside the body.

This embodiment of the locking element is called dissymmetrical.

In FIG. 2, the fitting is shown before the tube 7 is assembled, the retaining member 3 being in relaxed position with the retaining teeth 3b spaced apart to a maximum, in order not to come into contact with the tube 7. The retaining member 3 is blocked between the intermediate piece 4 by the conical portion 4b and by the end of the locking element or the rib 2f bearing on the rib 3a of the retaining member. The tube 7 is then engaged in the fitting, so that, after having passed through the inlet guide 6c, the seal 5 and the intermediate member 4, the tube freely passes through the retaining member 3 without tightening, until the end of the tube comes into abutment against the radial face 3d of the retaining member. In this position, the tube is fitted for three quarters of its stroke inside the fitting, but it is not retained and it may be withdrawn freely. The tensioning and locking stroke of the retaining member still remains to be effected. The tube 7 being in abutment against the retaining member, an effort is then necessary for the stroke of the tube to continue to the end of the fitting. This effort is established as a function of the elasticity of the members, the tube retaining member 3 always being elastic as it is constituted by a material acting in the manner of a spring and the locking element 2 being rigid.

The thrust of the tube 7 on the flange 3e makes it possible to overcome a hard point, of calculated effort, and which yields suddenly. At that moment, the rib 3a which is fast with the deformable portion of the retaining member 3, surmounts the rib 2f of the locking element 2 which is in abutment on the end of the body 1e and the rib 3a engages in the groove 2d of the locking element (FIG. 3), thus ensuring the tightening of the retaining member and its teeth 3b on the tube 7.

When the hard point yields suddenly, the tube, under the more energetic thrust effort which has been made, takes an accelerated speed and abuts with a shock against the piece bearing the radial stop; at the same time as this instantaneous rapid movement is produced, there is tightening and locking of the retaining member on the tube.

At the end of the rapid movement, the two pieces, locking element and retaining member, are at positions different from the initial position and are locked with respect to each other with the impossibility of taking back their initial position. The positions in which they are located are notched and give a total guarantee of maintaining the tube against vibrations or pressure forces.

The whole locking operation is felt by the user as a click with a movement causing a shock at the end of assembly. This is an automatic, mnemotechnic device in which the assembly operation is checked by pulling the tube, in order to verify that it is well retained.

FIG. 1 shows the fitting when the tube is mounted correctly and clicked and the retaining members locked. The pressure tending to eject the tube outside the fitting, the cone 3c of the retaining member abuts firmly on the piece 4 in its female cone and effects considerable additional penetration of the edges 3b in the tube 7. Simultaneously, the member 4 is fixed with force on the seal 5 which is compressed to ensure permanent tightness. The limited stroke of the member 4, which bears on one side on the seal 5 to compress it and which, on the other side, is stopped in its forward stroke between its face 4a and the radial face 1b of the fitting, presents the original feature of preventing this member 4 from advancing during assembly of the tube on the piece 3, which would have the detrimental consequence of tightening the retaining teeth prematurely. In this stop position, the member 4 releases the seal 5 which may expand freely during assembly of the tube. This largely facilitates assembly of the tube, which passes smoothly.

FIG. 4 shows the same fitting as in FIGS. 1,2 and 3, but the obturation means is replaced by a ring 8 of rectangular section, presenting a bore 8a of guiding the tube, said ring being maintained by an elastic split ring 9 disposed in a groove 1h in the body. The ring 8 is in abutment against a shoulder 1f of the body.

FIG. 5 shows a fitting which comprises a body 1 presenting a tapped hole 1b in which is screwed a hollow screw 11 with the interposition of an O-ring 10. The inner housing of the device is distributed, on the one hand, in the body 1 where the housing 1m limited by the radial shoulder 1e is used for the stroke of the retaining member 3 and, on the other hand, in the hollow screw 11 where said housing comprises the bores 11a, 11b and 11d. The locking element 2 comes into abutment against the body at 1t and it is guided in the bore 11a of the hollow screw. The locking element 2 is consequently constituted by a ring not comprising any radial flange and it presents a groove 2d and a circular rib 2f like the preceding locking element.

The intermediate member 4 for compressing the seal 5 is limited in its stroke by the crimped portion 11e.

The fitting is shown in FIG. 5 in the course of assembly when the tube having penetrated in the bore 11c, the seal 5 and the intermediate member 4 and having passed through the retaining member 3, is in abutment on the radial face 3d of the retaining member 3. The members are in a position just as the moment of locking. At that moment, the retaining teeth 3b are not in contact with the tube 7 and are well clear.

In FIG. 6, the inner device is identical to that shown in FIGS. 1 and 4 in a position of locking and under pressure; however, the body 1 presents a tapped hole 12b in which is screwed a hollow screw 12 in abutment by a shoulder 12a against the body 1.

The fitting shown in FIG. 7 comprises a body 1 in which is screwed on obturation member 14 presenting at one of its ends a conical portion 14b and, in its its median portion, a groove 14d in which the O-ring 5 is engaged. At its other end, the member 14 presents a bore 14c for guiding the tube. The seal 5 is not compressed and works normally. Between the body 1 and the obturation member 14, an O-ring 13 is disposed.

The fitting is shown before assembly of the tube, the locking element 2 being in abutment against the radial face 1t of the body and the retaining member 3 coming into abutment against the radial face 1e of the body 1, at the end of the locking operation.

Figure 8:
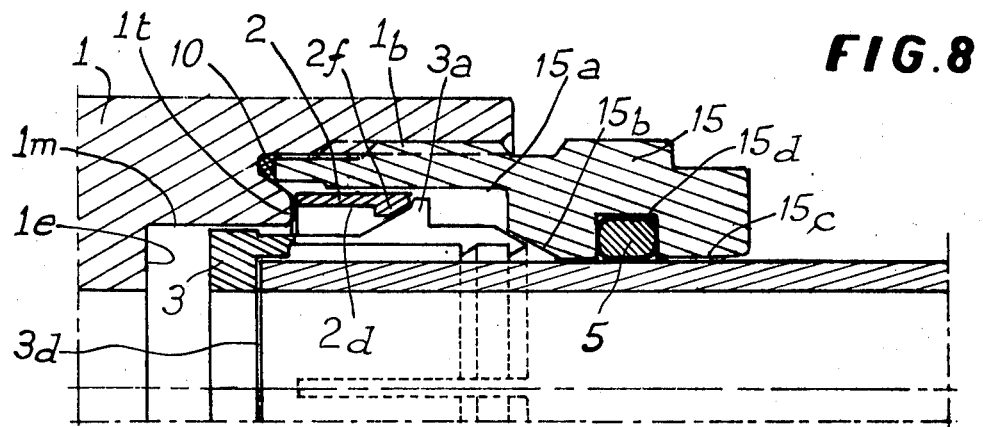
FIG. 8 is a half-view in axial section of a fitting comprising an envelope screwed in the body.

FIG. 8 shows an embodiment comprising a locking device identical to that of FIG. 5, with an obturating screw 15, but in which the seal 5 is not compressed, as it is simply engaged in a groove 15d in the screw 15. The fitting is shown in FIG. 8 when the tube is engaged before locking in the course of assembly.

Figure 9:
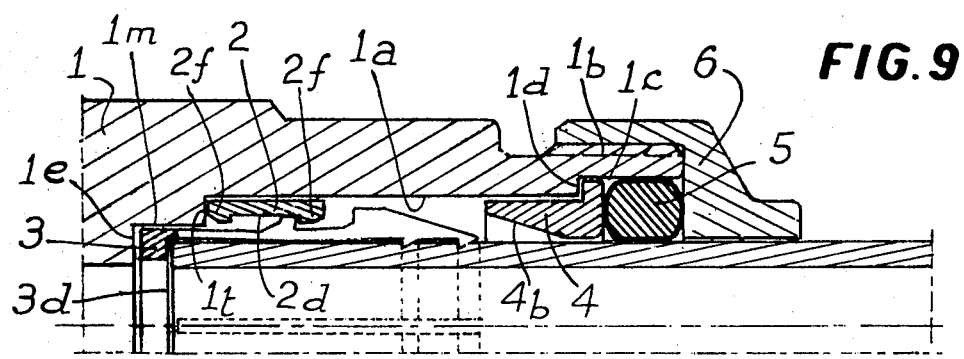
FIG. 9 is a half-view in axial section of a fitting of which the locking element is symmetrical.

FIG. 9 shows an embodiment of the fitting similar to that of FIG. 3, but in which the locking element 2 is of the symmetrical type. This locking element 2 is constituted by an annular piece presenting circular ribs 2f at its two ends between which a groove 2d is made.

The advantage of this locking element resides in that it may be mounted in any direction, therefore without any possible error. In this variant embodiment, the locking element 2 comes into abutment against a radial shoulder 1t of the body. FIG. 9 shows the fitting in the course of assembly when the tube is completely engaged, the retaining member 3 being locked by the locking element 2.

Figure 10:
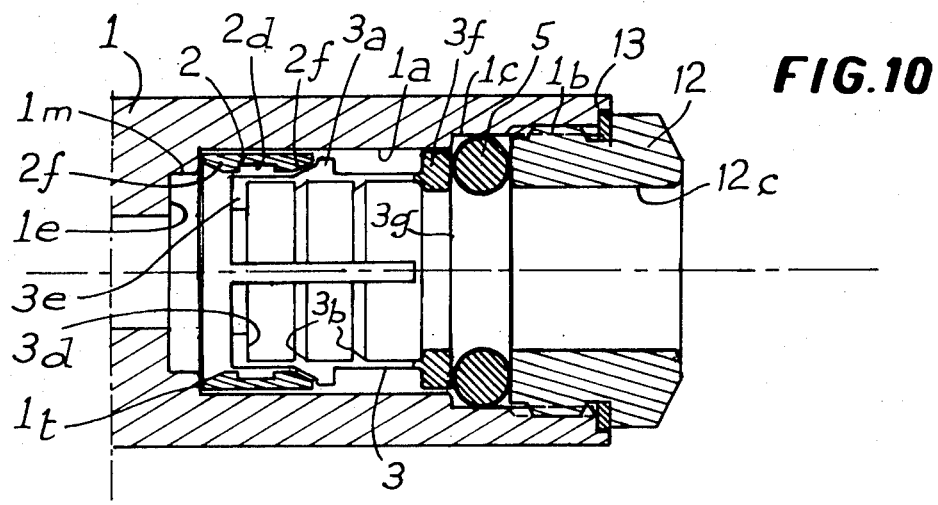
FIG. 10 is a view in axial section through a fitting before the tube is assembled, of which the retaining member is reversed and of which the annular portion is in contact with the O-ring.

FIG. 10 shows a fitting which comprises a body 1 presenting a tapped hole 1b in which is engaged a hollow obturating screw 12 comprising a bore 12c, with the interposition of an O-ring 13.

The seal 5 is capable of moving in the bore 1c of the body in limited manner. The retaining member 3 which is made differently from the preceding Figures presents a solid portion 3f of annular shape, which constitutes a direct support for the seal 5. The retaining teeth 3b are distributed at the centre of the retaining member and the locking rib 3a is centred between the two edges 3b. The member 3 is elastic and split in reverse with respect to FIGS. 1 to 3, including the stop 1e of the tube. The fitting is shown before assembly which is effected, like locking, exactly as in the embodiments shown in the preceding Figures. The seal 5 is compressed by the retaining member which, under the influence of the pressure, acts on the seal.

FIG. 11 shows the same fitting in locking position when the rib 3a of the retaining member is engaged in the groove 2d of the locking element and the teeth 3b are engaged in the wall of the tube.

FIGS. 12 and 13 show a device identical to that of FIGS. 10 and 11, but in which the retaining member 3 is made of thin sheet metal either by punching or stamping out. This member 3 presents cut-outs for forming retaining lips 3b at the end of the curved portions 3h. These curved portions 3h are adapted to be compressed by the locking element 2 and to click in the groove 2d thereof, as shown in FIG. 13.

In FIG. 12, the tube 7 is mounted inside the retaining member 3 before locking. For the tube to be able to be engaged at the end of the member 3 before locking, the latter comprises a split flange 3g so that there is a hard point between the bore 1c of the body and the bore 1a.

During locking, the flange 3g passes in the bore 1a, tightening slightly on the tube.

In FIG. 13, the tube is mounted completely and locked, the fitting being under pressure, the seal 5 is compressed by the retaining member 3. The seal 13 and the portion 12h constitute obstacles to dust and paint.

In FIGS. 12 and 13, the retaining member 3 is extended inside the tube by a support lining 16 which is necessary for certain tubes of plastics material.

Figure 15:
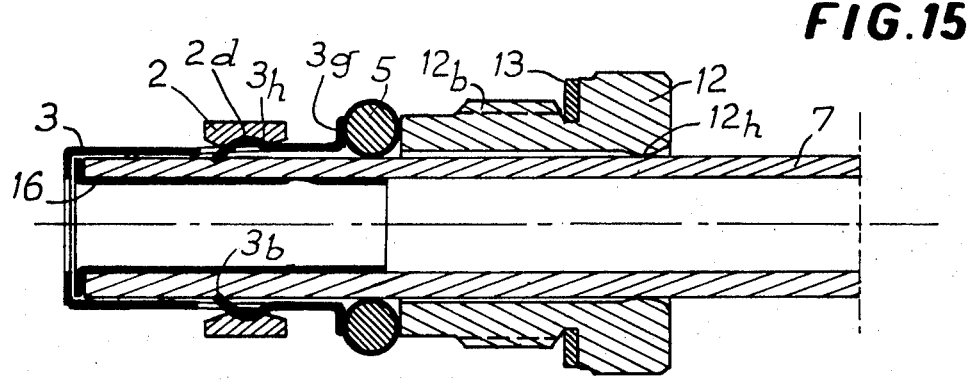
FIG. 15 is a view in section of the different members of the fitting shown in FIG. 12, dismantled, allowing the O-ring to be changed.

FIG. 15 shows the inner members of the fitting of FIG. 13 which have been dismantled by unscrewing the obturating screw 12.

This indicates the possibility of dismantling the seal 5 when the members have left the body and the ease of replacing the seal 5.

In fact, the piece 12 may be slightly withdrawn, and the assembly constituted by the locking element and the retaining member remains fast with the tube. After the seal has been replaced, it suffices to rescrew the nut and to reassemble the fitting. It should be noted that, in the majority of the embodiments, it is possible to effect the dismantling and replace the seal, this corresponding to an important feature of the invention.

FIG. 14 shows a fitting which corresponds to the embodiment of FIG. 7 for all the members except the locking element. In this case, the locking element is constituted by a large clip 17, particularly a split elastic ring, which may pass above a notch 3k and a conical portion 3m constituting the rib, in order to engage said clip on the portion 3n of the retaining member 3 which is thus locked. In this position, the clip firmly tightens the retaining member 3 on the tube 7. In FIG. 14, the tube is engaged in the fitting before locking.

Figure 16:
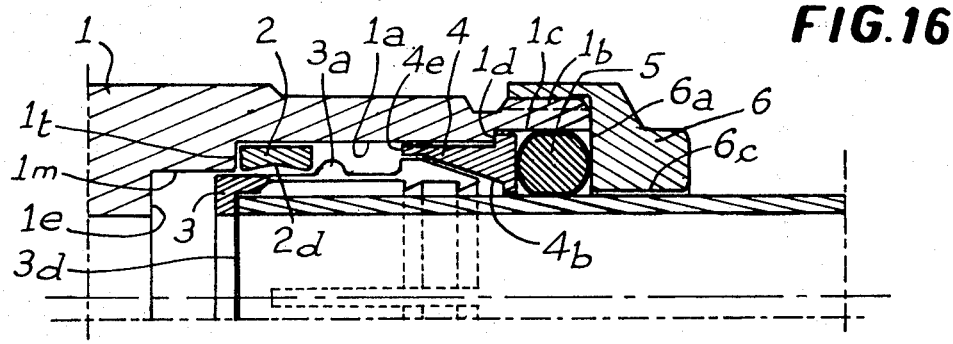
FIG. 16 is a half-view in axial section of a fitting with symmetrical locking element and with groove.

FIG. 16 is a variant of the embodiment of FIG. 1, which comprises a body 1 provided with an obturating nut 6, a seal 5 and an intermediate member 4. However, the locking means is different and it comprises a locking element 2 with short stroke. The annular rib 3a of the retaining member 3 must be forcibly engaged in the locking element 2 and is placed in the slightly recessed groove 2d, where the retaining member is considerably tensioned. This device presents the advantage of procuring a very sharp click upon assembly and a considerable tightening of the retaining edges. Moreover, and this is an important feature of this embodiment, the locking element 2 may be unlocked, after the nut has been dismantled, and taken out of the assembly of members. The locking element is therefore reversible with an appreciable effort which may necessitate the use of a tool for dismantling.

Figure 17:
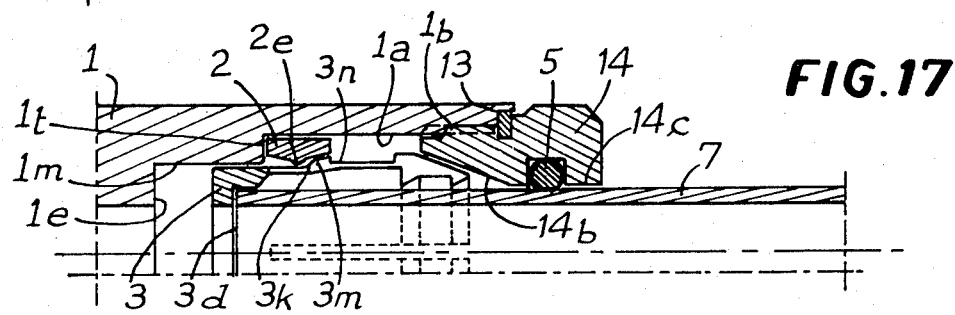
FIG. 17 is a half-view in axial section of a fitting comprising a locking element having a rib or central boss.

The fitting shown in FIG. 17 is a variant embodiment of FIG. 14 which differs from the preceding embodiments by the locking means. The locking element 2 is symmetrical, may be mounted in any direction, but instead of presenting a groove or hollow form, as shown in FIG. 16 at 2d, comprises a circular rib or form in relief 2e. Consequently, the retaining member must surmount this rib 2e, passing via its notch 3k and its rib 3m to bring the rib 2e of the locking element at 3n. In the embodiment shown, the tube is mounted inside the retaining member 3, before locking, in the course of assembly.

Figure 18:
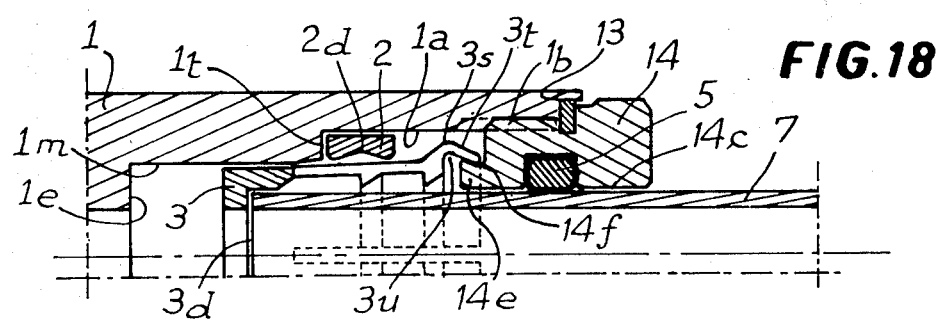
FIG. 18 is a half-view in axial section of a fitting of which the retaining member presents expansion elements mounted on a truncated portion of the body before the tube is engaged.

In the embodiment of the fitting shown in FIG. 18, the retaining member 3 which normally presents teeth disposed along a diameter ensuring a tightening of the tube is maintained artificially open in position of assembly. At its end located on the retaining teeth side, the retaining member presents fingers 3t which are engaged on a cone 14f of the obturating screw 14.

The tube is assembled in two stages:

(1) When the tube reaches the end of the retaining member 3, it ensures the release of the fingers 3t from the conical portion 14f and disconnects the member 3 which tightens on the tube 7.

(2) By prolonging the thrust on the tube towards the end of the fitting, the portion 3s is locked on the symmetrical locking element 2. In this device, a pretightening of the tube is added to the locking effort.

FIGS. 19, 20, 21 and 22 show fittings in which the interior members, according to the invention, are disposed in an envelope constituting a cartridge. This cartridge is adapted to be fixed with a short implantation in the body of an apparatus, with the possibility of a more or less rapid dismantling of the assembly.

Figure 19:
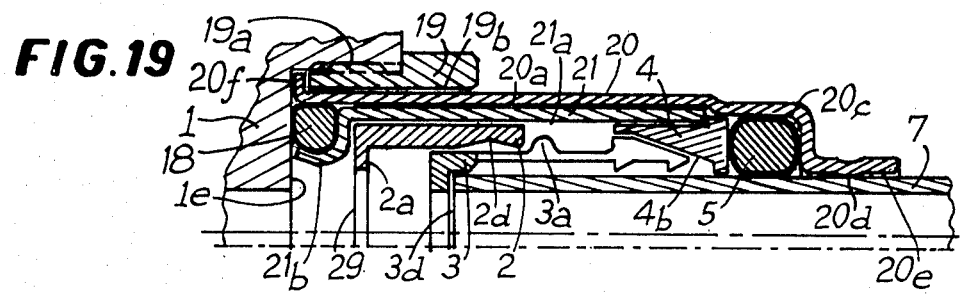
FIG. 19 is a half-view in axial section of a fitting comprising an envelope constituting a cartridge mounted on an apparatus.

FIG. 19 shows a fitting in which the locking element 2 and the intermediate member 4 are guided in a bore 21a of a distance piece 21. This distance piece 21 limits the stroke of the intermediate member 4 and it holds the annular O-ring 18. A thin envelope 20 made of pressed sheet metal holds the whole of the cartridge. The envelope 20 comprises a widening flange 20f which allows the fixing screw 19 to hold the cartridge in a simple, shallow housing in the apparatus 1.

To dismantle the tube 7, the screw 19 which fixes the fitting must be unscrewed and then the tube must be pushed in the cartridge, which enables all the interior members of the fitting to be taken out. It is easy to effect maintenance or dismantling by unlocking the locking element 2, or replacement of the seal 5. In this type of cartridge, the seal 5 undergoes compression of the intermediate member 4 by the pressure forces.

Figure 20:
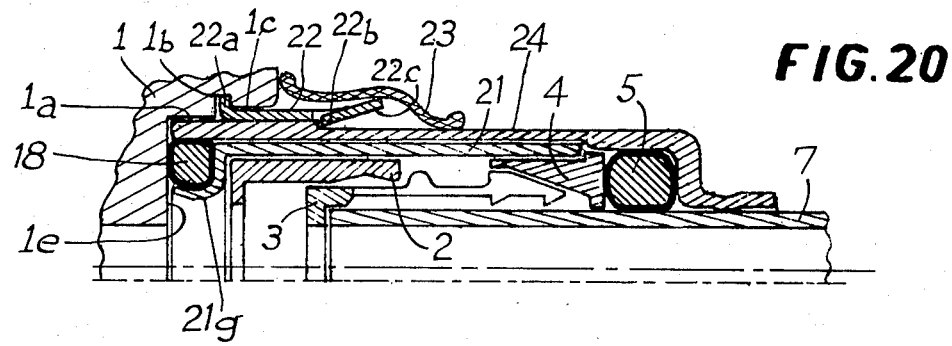
FIG. 20 is a half-view in axial section of a fitting comprising an envelope forming cartridge fixed by means of an elastic ring on an apparatus.

FIG. 20 shows a fitting in which the envelope 24 is different and allows instantaneous connection on the apparatus 1. To this end, the apparatus 1 presents a bore 1a and 1c, a groove 1b in which is housed a flange 22a of an elastic sleeve 22 (spring steel) comprising cut-out and folded edges 22b. The sleeve 22 is split into two and is easily placed in the groove and in its housing 1c. Assembly of the cartridge is instantaneous: it suffices to push it into its housing. A protective cover 23, which is optional, is disposed above the sleeve 22 to prevent oxidation thereof. Dismantling of the cartridge is instantaneous, with the aid of a conical piece (not shown in the drawing) which enables the retaining lip 22b to be moved away and the cartridge to pass.

Figure 21:
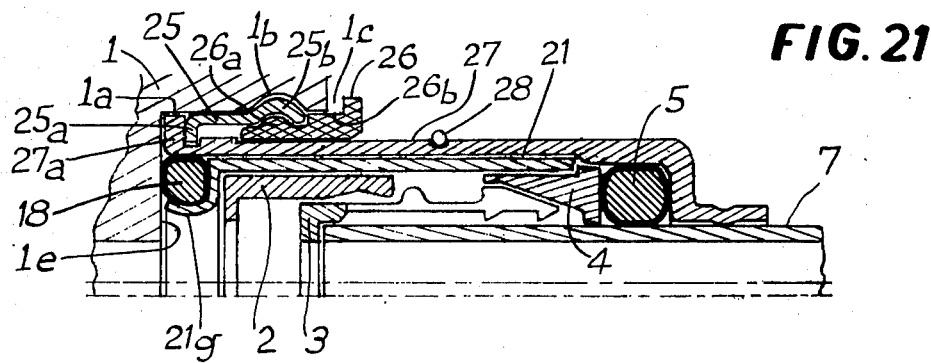
FIG. 21 is a half-view in axial section of a fitting comprising an envelope forming cartridge fixed by means of an elastic ring and a sliding ring on an apparatus.

In FIG. 21, the interior pieces are identical to those of FIG. 19, but the envelope 27 comprises a system for rapid fixing on the apparatus 1. The device comprises a ring 25 permanently mounted by its flange 25a which is in abutment on a flange 27a made at one of the ends of the envelope. This ring 25 is split and presents a concave part 25b which is adapted to be engaged or disengaged from a groove 1b in the apparatus by means of a sliding member 26. This member 26 slides over an outer cylindrical portion 27 and it is limited in its stroke by a clip 28. When it is unlocked with the aid of a screwdriver or a special fork at 1c, the member 26 is ejected up to clip 28 and the envelope or cartridge 27 may easily be withdrawn. Assembly is reversible: it suffices to push the envelope and, once it is in place, to push the member 26 which clicks on the portion 25b by its annular boss 26a. The body 1 comprises a fairly short, cylindrical single housing with a semi-circular groove 1b.

Figure 22:
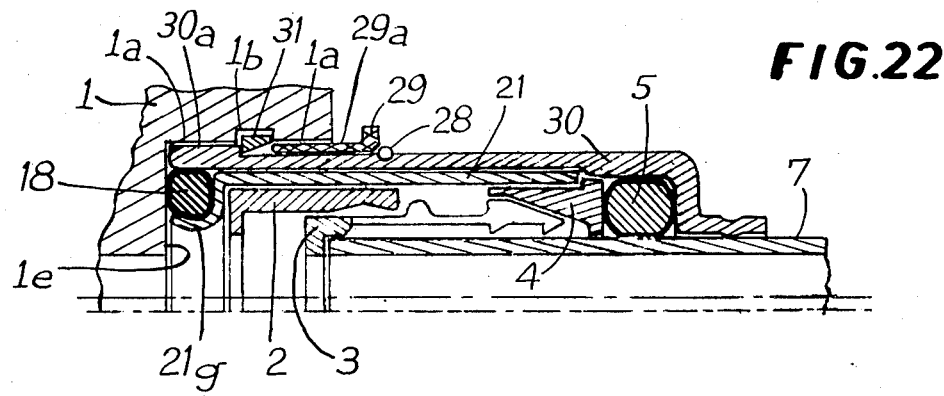
FIG. 22 is a half-view in axial section of a fitting comprising an envelope forming cartridge fixed by means of a clip in a groove of an apparatus.

In FIG. 22, the interior members are identical to those of FIG. 19, but the envelope or cartridge 30 is held in the body 1 of the apparatus by a clip 31 of trapezoidal section which is permanently mounted in the groove 1b of the body 1. The envelope is assembled by simply pushing it in the body. A guide push element 29 mounted to slide on the outer diameter of the envelope and limited in its stroke by a clip 28 allows the instantaneous dismantling of the cartridge. It suffices to press on the flange of the push element 29 to open the clip 31 and thus to dismantle the cartridge instantaneously by traction.

In the fittings shown in FIGS. 20, 21 and 22, the interior part is dismantled in the same manner as in FIG. 19, after having dismantled the envelope of the apparatus 1 on which the latter is mounted.

FIGS. 23, 24, 25 and 26 show a means for incorporating a fitting according to the invention with a body comprising at the other end conventional means for assembly on currently known fittings. The fitting shown in FIG. 23 comprises an interior device identical to that shown in FIG. 16, but it presents an obturating ring 8 held by a clip 9 mounted in a groove 1h of the body 1. At the other end of the body, the latter presents a smooth cylindrical tail element 1n on which is pre-crimped a compression fitting ring 32 comprising a tightening nut 31. The device is shown when the tube is in the course of assembly and when it reaches the end of the retaining member 3 before locking.

Figure 23:
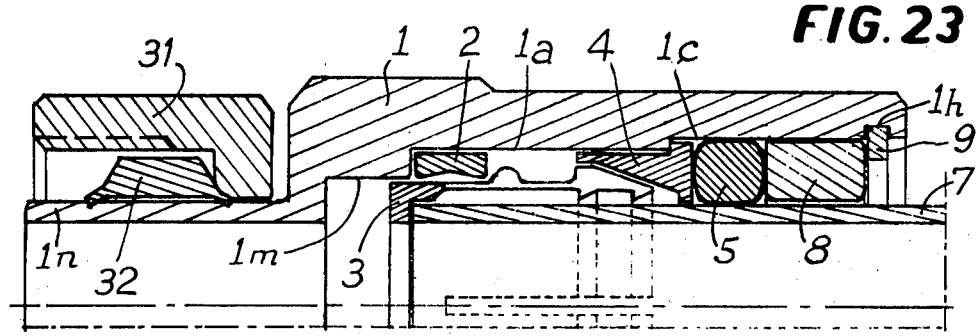
FIG. 23 is a half-view in axial section of a fitting according to the invention, of which the body comprises at the other end a fitting with compression ring.
Figure 24:
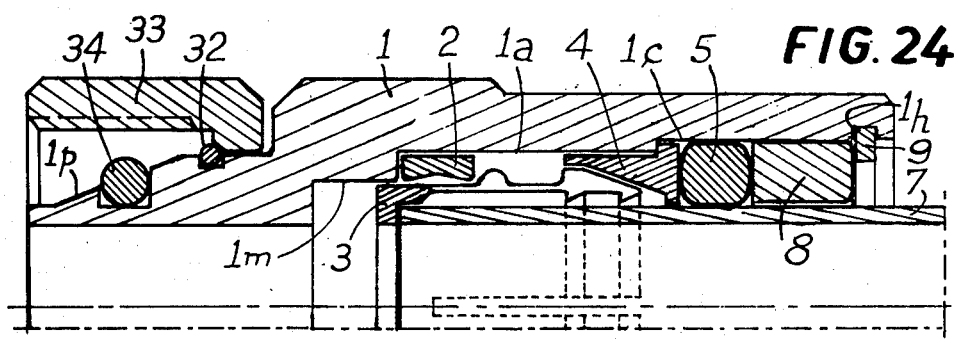
FIG. 24 is a half-view in axial section of a fitting according to the invention, of which the body comprises at its other end a conical fitting with ring.

FIG. 24 shows a fitting which comprises the same interior members as the one shown in FIG. 23. At the other end of of the body 1, the latter presents a cone 1p and a sealing ring 34 in a groove, a nut 33 retained by a clip 32 disposed in a groove ensures the tightening of the connecting member of the other fitting. This type of connection is mounted in conventional fittings with female cone.

Figure 25:
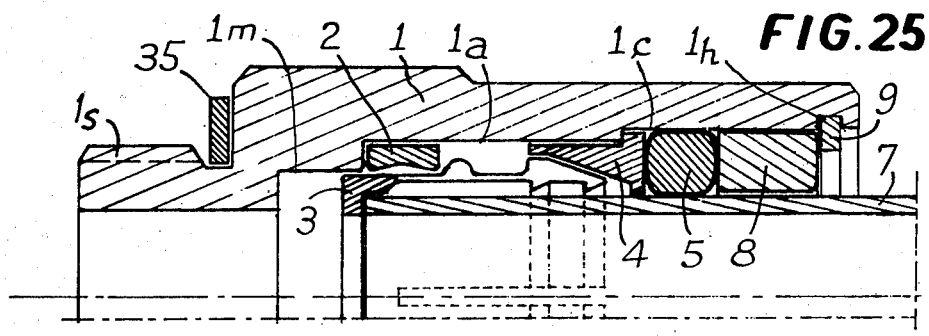
FIG. 25 is a half-view in axial section of a fitting according to the invention provided at its other end with a threaded portion.

FIG. 25 shows a fitting comprising the same interior members as the one shown in FIG. 23. At the other end of the body 1, the latter presents a male thread 1s and an O-ring 35 which enables a connection member to be conventionally mounted on all apparatus comprising a cylindrical tapping (the threading 1s may be conical).

Figure 26:
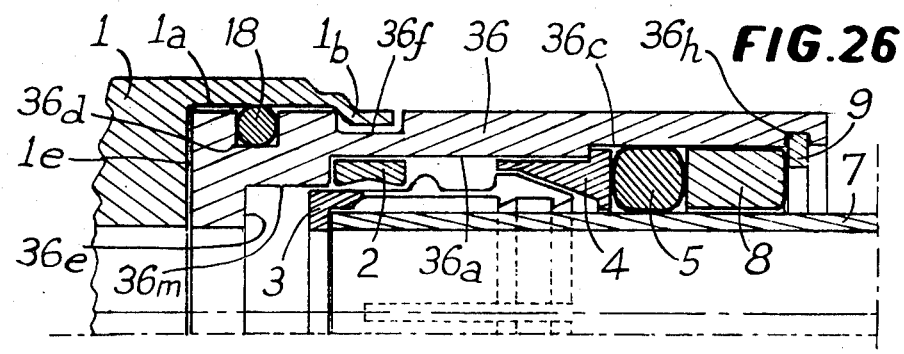
FIG. 26 is a half-view in axial section of a fitting comprising an envelope forming cartridge fixed on the apparatus by a crimped portion.

FIG. 26 shows a device according to the invention and comprising interior members identical to those of the fitting of FIG. 23, mounted in an envelope or cartridge 36 forming an assembly which may be incorporated in an apparatus 1 by crimping. The envelope 36 comprises a groove 36d in which an O-ring 18 is mounted and it is mounted in a simple housing with cylindrical bore 1a presenting a base 1e. The envelope comprises another groove 36f in which an edge 1b of the apparatus is crimped. The envelope is therefore made in non-dismountable manner on the body and rendered fast therewith. The fitting and the interior members are dismantled by dismantling the clip 9 and withdrawing the members.

Figure 27:
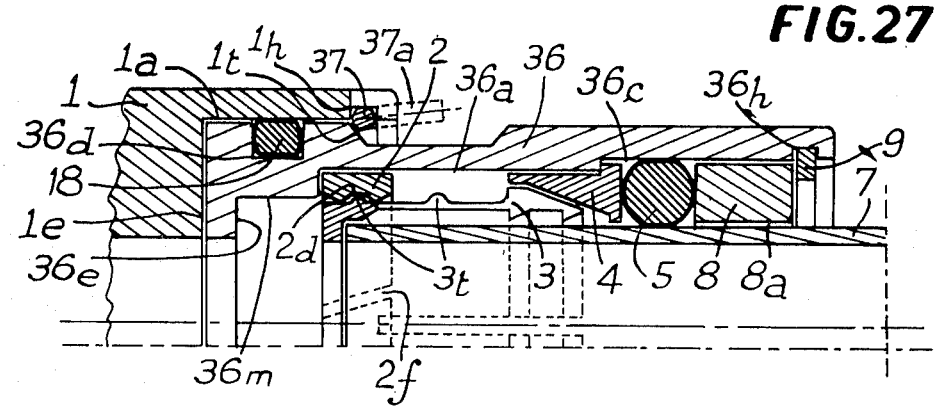
FIG. 27 is a half-view in axial section of a fitting comprising an envelope forming cartridge fixed by means of an elastic ring and a symmetrical elastic split locking element in tension.

The fitting shown in FIG. 27 presents a particularly noteworthy locking means.

The locking element 2 is made of treated spring metal and it has been forcibly mounted on the non-split end of the retaining member 3 where the annular groove 2d of the locking element corresponds to the rib 3t of the member 3. This locking operation is perfectly accompanied by the effect of sharp displacement due to the tightening force of the locking element 2 on the retaining member 3. This particular assembly is mounted inside an envelope or cartridge of similar construction to that of FIG. 24, but it does not comprise any crimped portion, fixing being effected by a clip 37 mounted in a groove 1h of the body 1 of the apparatus and which cooperates with a conical portion 1t of the envelope.

The clip 37 comprises a tab 37a enabling it to be withdrawn for dismantling of the envelope 36.

Figure 28:
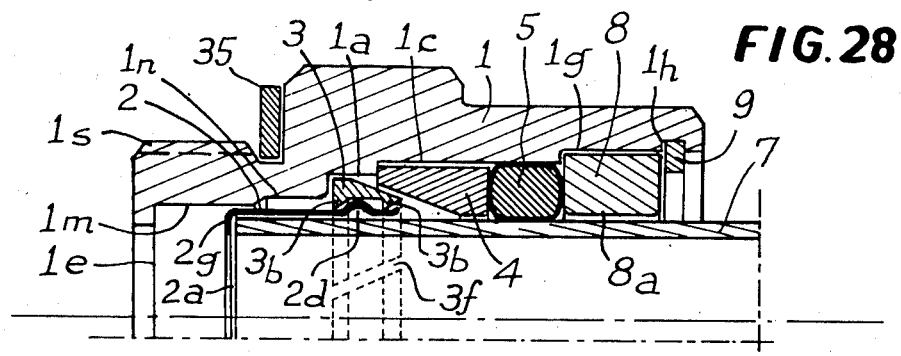
FIG. 28 is a half-view in axial section of a fitting of which the locking element is made of thin material and the retaining member a split elastic ring.
Figure 29:
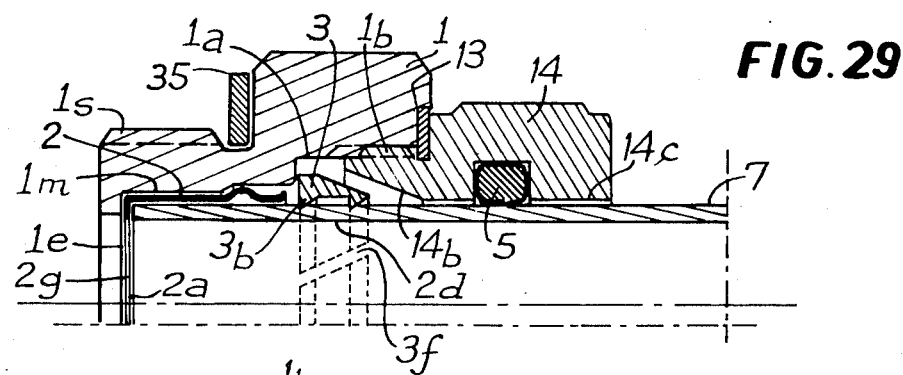
FIG. 29 is the same view of the fitting as in FIG. 28, after the tightening ring has been released.
Figure 30:
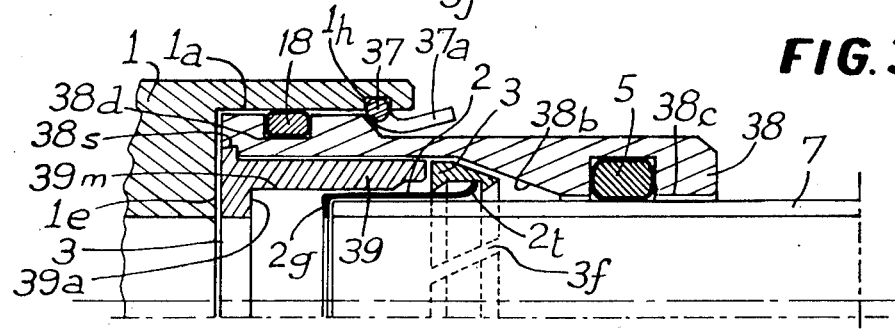
FIG. 30 is a half-view in axial section of a fitting identical to that of FIG. 28, but comprising an added abutment member and an envelope forming cartridge.

FIGS. 28, 29 and 30 show a fitting in which the locking element 2 presents a radial face 2g which comprises a stop 2a on which the tube 7 acts to effect the tube retaining operation.

The retaining member 3 is simplified and shorter as it is constituted by an elastic ring made of spring metal permanently tightening on the tube, said ring presenting a slit 3f and conventional retaining teeth. The member 3 is forcibly mounted on the locking element 2, so that the tube may be freely engaged to the end of the locking element 2, as shown in FIG. 28. It then suffices to exert a slightly greater force on the tube which produces an effect of sharp, rapid unlocking as well as the shock at the end of the fitting.

During this operation, the locking element 2 disconnects from the retaining member 3 which tightens suddenly on the tube and provokes penetration of the retaining edges 3b.

FIG. 28 shows the tube 7 mounted in abutment at the end of the locking element 2 before unlocking. The body 1 comprises at one of its ends a thread 1s adapted to constitute a fitting to be screwed on a conventional apparatus. It should be noted that the device comprises an intermediate member 4 allowing the compression of the O-ring 5 under the effect of the traction of the tube under pressure.

In FIG. 29, the fitting is shown with an obturating screw 14 comprising a cone 14b and a seal 5 in an annular groove. The tube is mounted inside the locking element 2 and the unlocked retaining member, tightened on the tube, assembly being terminated.

FIG. 30 shows a fitting provided with a simplified locking element, in which the annular boss or rib 2d is replaced by a widening edge 2t. The result is exactly the same from the point of view of functioning. The tube drives the locking element 2 from the retaining member 3 which tightens on the tube 7. This operation is produced with the notch and acceleration of the entry of the tube. The assembly is mounted in an envelope or cartridge 38 closed by a stop and guide member 39 which is fitted with a slight undercut 38s; the whole of the cartridge 38 is mounted in the body of an apparatus 1 in the same manner as in FIG. 25, with the aid of a clip 37. The fitting is dismantled by separating the envelope of the apparatus and then pushing the tube which ejects all the interior members which become accessible. FIG. 29 shows the retaining member 3 in tightening position after its release from the locking element 2.

The user who assembles a tube in fittings according to FIGS. 28, 29 and 30 and who pushes on the locking element 2 does not feel any difference from the device of the other preceding embodiments in which the retaining member 3 is pushed; in fact, the user feels the same hard point followed by a rapid acceleration of the tube and a shock at the end of the fitting.

Figure 31:
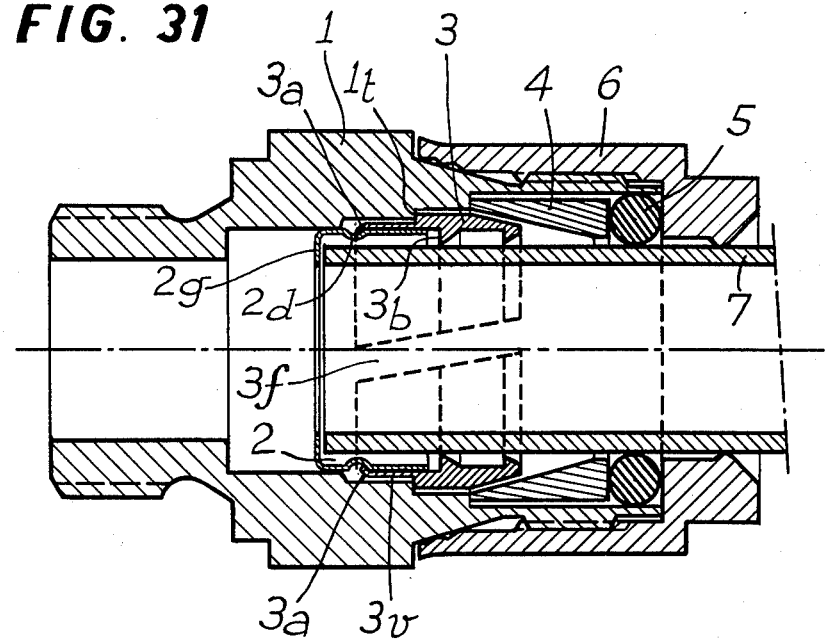
FIG. 31 is a view in axial section of a fitting comprising a locking element which is partially engaged under the cover of the retaining member in locked position.

FIG. 31 shows a fitting which is a variant of the fittings shown in FIGS. 28 to 30 and in which the retaining member 3 is constituted by an elastic split ring presenting a tubular portion 3v which is forcibly engaged on the locking element 2 which presents a groove 2d in which the folded down end 3a of the retaining member 3 is engaged. The tube 7 is engaged in the locking element 2 and it is in abutment against the radial flange 2g of the locking element. Upon thrust on the tube, and the retaining member 3 being in abutment against the shoulder 1t of the body, the locking element 2 is taken along so that the end 3a is disengaged from the groove 2d of the locking element which is taken along as far as the end of the body 1, releasing the retaining member 3 which tightens on the tube 7 by its teeth 3b.

Figure 32:
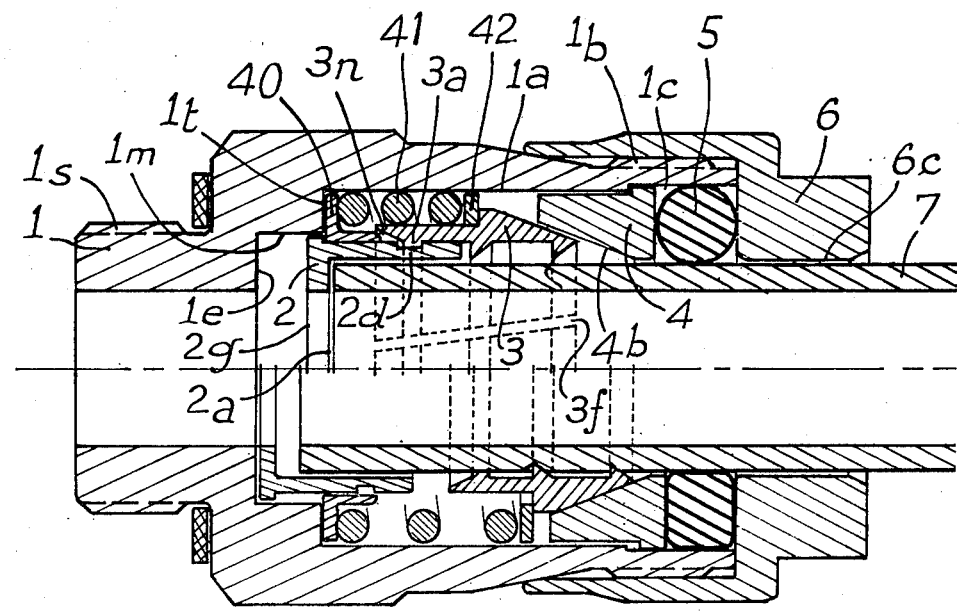
FIG. 32 is a view in axial section of a fitting comprising a spring between the locking element and the retaining member.

FIG. 32 shows a fitting which is adapted to be used at very low pressures or with vacuum and where the forces of pressure, which are too low, cannot effect tensioning and self-seal. In this case, the holding and seal are assisted by a complementary prestressed spring 41, maintained by the positively engaging locking element 2 and retaining member 3, the rectangular rib 3a being engaged in the groove 2d. The spring 41 is in abutment on one side against a washer 42 in abutment against a shoulder of the retaining member 3 and, on the other side, against a release ring 40 in abutment against the body.

The ring 40 provokes unlocking of the retaining member 3 by acting on the cone 3n, under the effect of the thrust of the tube 7.

In the top half-view of FIG. 32, the spring 41 is tightened in the course of assembly of the tube, before unlocking. In the bottom half-view of FIG. 32, the locking element is released and the fitting is in position of normal functioning. The spring 41 exerts a thrust via the washer 42 and the member 3 on the cone 4b and the piece 4 on the seal 5. Thus, even without pressure or in vacuo or at very low pressure, the tube is held perfectly by the self-tightening of the retaining member increased by the conical effect, and the tightness is ensured by the O-ring which is compressed.

Figure 33:
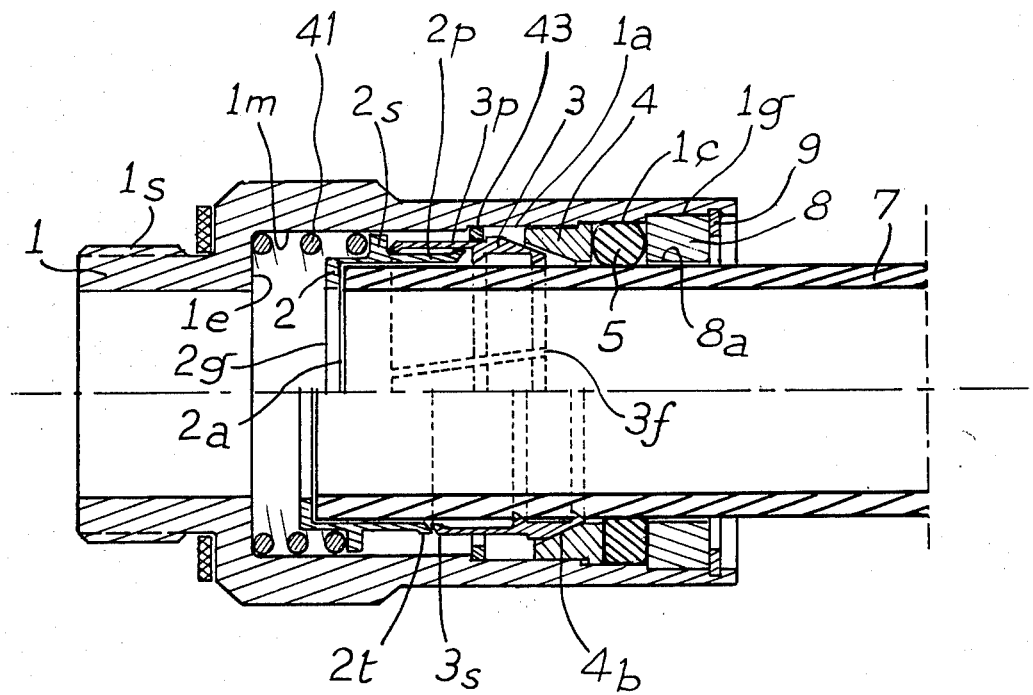
FIG. 33 is a view in section of a fitting comprising a spring between the end of the housing and the locking element.

The fitting shown in FIG. 33 has the same purpose as that of FIG. 32 and it may be used for very low pressures, or in conduits in vacuo wherever the pressure is insufficient to ensure holding of the tube and tightness.

To this end, the retaining member 3 which presents a slit 3f is mounted on the locking element 2 maintained open and immobilised axially by a washer 43. A spring 41 at rest is disposed behind a flange 2s of the locking element 2.

The top half-section shows the fitting in the course of assembly before unlocking of the retaining member 3. The tube 7 pushes the locking element 2 along the retaining member 3 until the click means 2t and 3s are in contact and simultaneously the spring 41 completely tightened. A click is produced, upon passage of the rib 3s over rib 2t. The retaining member 3 is closed by its own elasticity on the tube 7 and is thus disposed end to end with the locking element 2. The latter pushed by the spring 41 pushes the retaining member 3 over the conical portion 4b and the intermediate member 4 on the O-ring 5.

The bottom half-section of FIG. 33 shows the fitting with the locking element 2 released and the fitting in normal functioning. The tube is maintained perfectly and its tightness is ensured as in the preceding embodiment.

The invention finds applications in all domains involving fluids under pressure and, in particular, in a preferred range of 0 to 40 bars, with the possibility of having higher pressures by strengthening the seals and increasing the number of edges retaining the tube. The device is particularly adapted to the use of the instant assembly on lorry braking circuits functioning with compressed air. This connecting device contributes complete safety and virtually no time is required for placing the tube. The domains where safety is of primordial importance, dangerous gases, and particularly combustible gases, applications in chemistry with products requiring considerable safety precautions are particularly favourable tor the use of this invention. Another field where the invention is particularly advantageous is the instant fitting of plastic pipes in sanitary equipment for diffusing hot and cold water in dwellings and industrial premises, with considerable savings in man-power.

The description which has just been given is, of course, not limiting and the man skilled in the art may make various modifications thereto without departing from the scope of the invention.

What is claimed is:

1. A fitting for a smooth, plain-end tube comprising:
   (a) a hollow body defining a first bore opening through one end of the hollow body and a second bore opening through the other end of said body and communicating with the first bore, the diameter of the first bore being larger than the outside diameter of the tube such that the tube may be inserted therein;
   (b) a locking member disposed within the first bore;
   (c) a retaining member disposed in the first bore such that it receives the plain end of the tube therein and is capable of movement in a direction generally parallel to the longitudinal axis of the first bore, at least a portion of the retaining member being radially deformable to engage the outer surface of the tube;
   (d) clicking means on the retaining member engagable with the locking member to give a tactile indication to the user of the locking of the tube in the hollow body, the clicking means contacting a first portion of the locking member when the tube is inserted into the retaining member and the housing a predetermined distance to act as an initial stop against movement of the retaining member, such that, upon application of additional force to the tube by the user, the initial stop is overcome and the retaining member snaps into engagement with the locking member thereby deforming the retaining member into engagement with the outer surface of the tube; and
   (e) obturating means surrounding the tube and attached to the hollow body to prevent withdrawal of the retaining and locking members from the first bore.

2. The fitting of claim 1 further comprising a seal disposed about a portion of the tube to prevent leakage of a pressurized fluid flowing through the tube and hollow body.

3. The fitting of claim 2 wherein the clicking means comprises a first rib disposed on the interior surface of the locking member, and a second rib located on the exterior surface of the deformable portion of the retaining member, such that the two ribs abut against each other to act as the initial stop and whereupon the application of the additional force causes the retaining member to radially deform, thereby allowing the second rib to pass to the other side of the first rib and lock the retaining member and locking member together.

4. The fitting of claim 3 further comprising an intermediate member disposed in the first bore of the hollow body axially between the retaining member and the seal.

5. The fitting of claim 4 further comprising a female conical portion located on the intermediate member; and a corresponding male conical taper located on the retaining member capable of engaging the female conical portion, the engagement of the conical portions acting as a wedge to urge the radially deformable portion of the retaining member into contact with the tube.

6. The fitting of claim 5 wherein the diameter of the second bore in the hollow body is approximately equal to the inside diameter of the tube.

7. The fitting of claim 6 wherein the retaining member defines a plurality of longitudinal slots extending partially along its length to facilitate radial deformation.

8. The fitting of claim 2 wherein the diameter of the second bore in the hollow body is approximately equal to the inside diameter of the tube.

9. The fitting of claim 2 wherein the retaining member defines a plurality of longitudinal slots extending partially along its length to facilitate the radial deformation.

10. The fitting of claim 2 wherein the obturating means comprises a nut member that is threadingly engaged with the hollow body.

11. The fitting of claim 10 further comprising an intermediate member disposed in the first bore of the hollow body such that the seal is located axially between the nut member and the intermediate member.

12. The fitting of claim 11 wherein the nut member threadingly engages the exterior of the hollow body.

13. The fitting of claim 11 wherein the nut member is externally threaded and engages corresponding internal threads on the hollow body.

14. The fitting of claim 2 wherein the obturating means comprises a ring inserted into the hollow body and means to retain the ring in its inserted position.

15. The fitting of claim 14 further comprising an intermediate member disposed in the first bore of the hollow body such that the seal is located axially between the ring and the intermediate member.

16. The fitting of claim 10 wherein the nut member defines a female conical portion extending into the first bore; the retaining member defines a correspondingly tapered male conical portion capable of engaging the female conical portion wherein the interengagement of the conical portions acts as a wedge to urge the radially deformable portion of the retaining member into contact with the tube.

17. The fitting of claim 16 wherein the nut member defines an annular groove to retain the seal in position about the tube.

* * * * *